April 1, 1941.  C. V. BROADLEY  2,236,992
BROILING PAN
Filed May 8, 1939
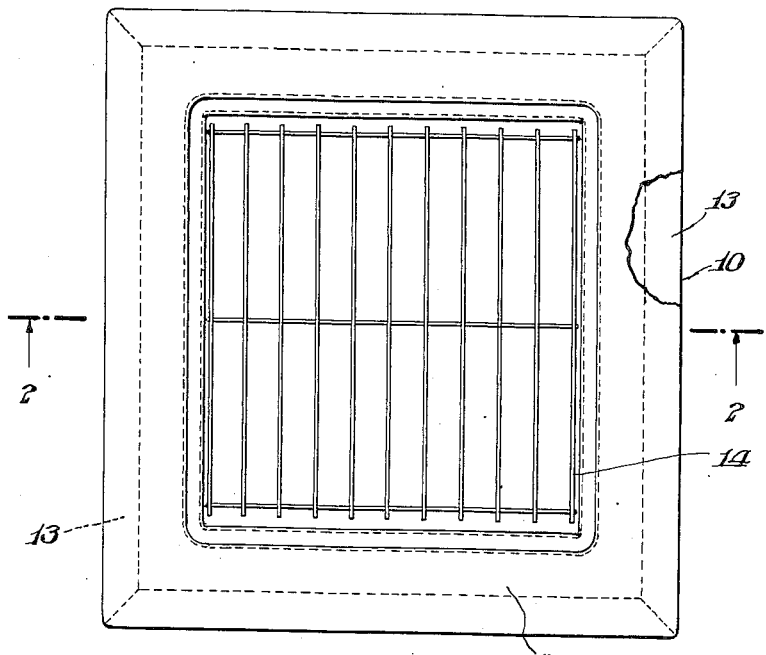
Fig. 1.
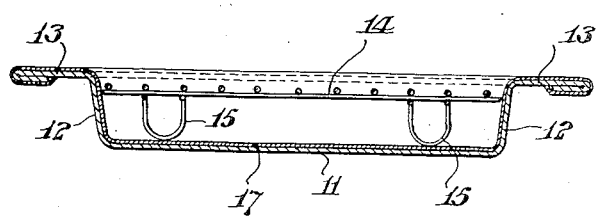
Fig. 3.   Fig. 2.
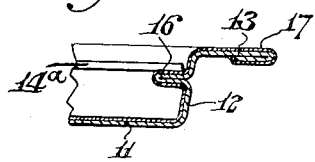
INVENTOR:
Charles V. Broadley,
BY Z. T. Wobensmith 2nd
ATTORNEY.

Patented Apr. 1, 1941

2,236,992

UNITED STATES PATENT OFFICE 2,236,992

BROILING PAN

Charles V. Broadley, Riverton, N. J.

Application May 8, 1939, Serial No. 272,378

5 Claims. (Cl. 53—5)

This invention relates to broiling pans, and more particularly to a broiling pan having a lining with numerous advantageous features hereinafter more fully pointed out.

In the broiling of fish, meat, fowl and the like, by the radiant and other heat directly derived from a gas flame or the electric broiling unit of a cooking range, quantities of juices are driven off during the broiling which are collected in the broiling pan disposed below the food material which is being cooked. With fish, meat, fowl and the like, the juices thus driven off and collected in the broiling pan have a high grease content and because of this cleaning of the broiling pan after use has heretofore been a troublesome operation.

In cooking these food materials, as well as other food materials, portions of the juices which are driven off are frequently carbonized on and firmly adhere to the broiling pan by reason of the relatively high temperatures employed for the broiling. The removal of these carbonized materials from the broiling pan has also heretofore been a difficult and troublesome operation.

It has also heretofore been necessary in broiling food materials, such as fish, meat, fowl and the like, to turn the food being cooked so that the broiling operation was effected on and from each side of the food material. The repeated turning of the food material is often inconvenient.

It is an object of the present invention to provide an improved combination of a broiling pan and a liner therefor which will minimize the amount of cleaning of the broiling pan which will be required and which will also increase the efficacy of the broiling operation.

The nature and characteristic features of the invention will be more readily understood from the following description, taken in connection with the accompanying drawing forming part hereof, in which:

Figure 1 is a top plan view of a preferred embodiment of the invention, parts being broken away to illustrate the nature of the invention;

Fig. 2 is a vertical sectional view taken approximately on the line 2—2 of Fig. 1; and Fig. 3 is a fragmentary vertical sectional view showing the present invention applied to a different type of a broiling pan.

It will, of course, be understood that the description and drawing herein contained are illustrative merely, and that various modifications and changes may be made in the structure disclosed without departing from the spirit of the invention.

Referring more particularly to the drawing, the broiling pan 10 illustrated may be of any preferred type, the pan shown being merely conventional. The broiling pan 10 includes the usual generally horizontal bottom wall or floor 11, sloping side wall 12, and a generally horizontally disposed rim 13 which may rest on guides or supports (not shown) of the type customarily provided within the oven of the range where the broiling operation is customarily effected.

In some types of range ovens the broiling pan is supported by a horizontally adjustable frame on which the floor or bottom wall 11 rests. Within the broiling pan the customary rack 14 is provided for supporting the food material above the bottom wall or floor 11 and this rack may be of any preferred type.

In the form of rack illustrated in Figs. 1 and 2 supporting legs 15 are provided for spacing the rack 14 above the wall or floor 11.

In the form of broiling pan illustrated in Fig. 3 the broiling pan has a ledge 16 formed in the side walls 12 upon which the rack 14ª rests and by which the rack 14ª is supported.

In accordance with the present invention the broiling pan 10 is provided with a removable liner 17 which is made preferably from a single sheet of thin metallic material which is larger than the area of the flat surfaces on one face or side of the broiling pan 10 and which is shaped by the user. The metallic material preferably comprises a bendable material which will not be readily injured in use, which is resistant to and not injured by the temperatures employed, and which does not have any poisonous effect in itself upon human beings and which is not poisonous in its reactions with the food materials. For this purpose a thin sheet of aluminum foil has been found satisfactory.

In use the sheet of metallic foil is provided. The rack 14 is removed from the broiling pan 10 and the sheet is formed by hand by the user within and to conform to the bottom wall or floor 11 of the broiling pan 10, is folded or bent up along the slanting side walls 12 and over the rim or ledge 13, and is bent under the rim or ledge 13 to hold the sheet in place. The rack 14 is then inserted in the broiling pan 10 and the food material to be cooked is placed upon the rack 14 in the usual manner. The broiling pan 10 may then be inserted in the oven adjacent the broiler unit, whether gas or electric, and the broiling operation on the food material carried out. The bent under portions of the liner 17 may with reasonable care be readily moved along the supports within the oven without injury thereto, and as the broiling proceeds the food juices are collected within the liner 17.

During the broiling operation the radiant heat from the burner is reflected from the bright upper surface of the metallic sheet and is effective on the lower side of the food material which is supported on the rack 14 so that cooking of the underside proceeds while the upper side is being cooked. The time required for broiling is lessened, and upon the turning of the food material, if this is necessary for the completion of the broiling operation, a much shorter period of time is required for the completion of the broiling.

After the broiling has been completed the rack 14 is removed and the juices from the food, including the grease and carbonized materials are all retained within the liner 17. This liner 17 may be quickly and easily removed from the pan 10 and folded up and thrown away with the juices therein. The broiling pan which has been covered and protected by the liner 17 requires little, if any, cleaning.

I claim:

1. In combination with a broiling pan having a bottom wall and side walls, a rack for supporting the food to be broiled above the bottom wall, a removable liner overlying the inner faces of the bottom and side walls of the broiling pan, said liner consisting of a thin bendable metallic sheet conforming to the shape of the inside of the broiling pan, and said rack having portions in contact with said liner.

2. In combination with a broiling pan having a bottom wall and side walls, a rack for supporting the food to be broiled above the bottom wall, a removable liner overlying the inner faces of the bottom and side walls of the broiling pan, said liner consisting of a thin bendable sheet of aluminum conforming to the shape of the inside of the broiling pan, and said rack having portions in contact with said liner.

3. In combination with a broiling pan having a bottom wall, side walls, and a rim portion spaced above the bottom wall, an open grille rack supporting the food to be broiled above the bottom wall, a removable liner overlying the bottom and side walls of the broiling pan, said liner consisting of a thin bendable sheet of metallic material conforming to the shape of the inside of the broiling pan and extending under the rim portion for holding the liner in position, said rack having portions in contact with said liner.

4. In combination with a broiling pan having a bottom wall, side walls, and a rim portion spaced above the bottom wall, a rack for supporting the food to be broiled above the bottom wall, a removable liner overlying the bottom and side walls and extending across the rim portion, said liner consisting of a thin metallic sheet of material bendable to conform to the shape of the inside walls of the broiling pan and for contact therewith for collecting and retaining the materials falling therein from the broiling and for reflecting heat to the underside of the food on the rack.

5. In combination with a broiling pan having a bottom wall, side walls, and a rim portion spaced above the bottom wall, an open grille rack for supporting the food to be broiled above the bottom wall, a removable liner overlying the bottom and side walls and extending across and under the rim portion, said liner consisting of a thin bendable metallic sheet of aluminum conforming to the shape of the inside walls of the broiling pan and in contact therewith for collecting and retaining the materials falling therein from the broiling and for reflecting heat to the underside of the food on the rack.

CHARLES V. BROADLEY.